T. TRIPOLITIS.
BUTTER DISPENSING DEVICE.
APPLICATION FILED SEPT. 26, 1919.

1,359,206.

Patented Nov. 16, 1920.
6 SHEETS—SHEET 1.

Witness
H. Woodard

Inventor
T. Tripolitis
By H. B. Willson & Co.
Attorneys

T. TRIPOLITIS.
BUTTER DISPENSING DEVICE.
APPLICATION FILED SEPT. 26, 1919.

1,359,206.

Patented Nov. 16, 1920.
6 SHEETS—SHEET 2.

Witness
H. Woodard

Inventor
T. Tripolitis
By H. B. Willson & Co.
Attorneys

UNITED STATES PATENT OFFICE.

THEMIOS TRIPOLITIS, OF CLEVELAND, OHIO.

BUTTER-DISPENSING DEVICE.

1,359,206.  Specification of Letters Patent.  Patented Nov. 16, 1920.

Application filed September 26, 1919. Serial No. 326,480.

*To all whom it may concern:*

Be it known that I, THEMIOS TRIPOLITIS, a subject of the King of Greece, residing at Cleveland, in the county of Cuyahoga and State of Ohio, have invented certain new and useful Improvements in Butter-Dispensing Devices; and I do declare the following to be a full, clear, and exact description of the invention, such as will enable others skilled in the art to which it appertains to make and use the same.

My invention relates to improvements in machines for cutting butter into small pieces and depositing them on butter chips for use in lunch rooms, cafés and the like, and my object is to improve upon several features of the device protected by my U. S. Patent No. 1284493 of Nov. 12, 1918.

With the foregoing in view, the invention resides in the novel features of construction and unique association of parts hereinafter described and claimed, the descriptive matter being supplemented by the accompanying drawings.

Fig. 2 is a vertical transverse section on the plane of line 2—2 of Fig. 1, and this view indicates by the line 1—1, approximately the planes on which Fig. 1 is cut.

Fig. 16 is a detail horizontal section showing a different form of knife operating means.

In the drawings above briefly described, the numeral 1 designates a suitable casing for the butter dispensing mechanism, said casing being preferably provided at one side with a plurality of compartments or reservoirs 2 for containing milk, water and any other desired liquids. An ice box 3 extends across the backs of the casing 1 and the reservoirs 2 and serves to effectively cool them. Although I have shown the casing 1 in connection with the reservoirs 2, it is to be understood that it may in some instances be used independently thereof, but the relation shown is preferable on account of its general convenience for use in lunch rooms and the like.

Figure 8:
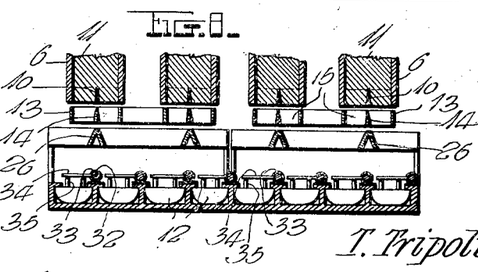
Fig. 8 is a detail longitudinal section on approximately the plane of line 8—8 of Fig. 3, showing more particularly the means for cutting the butter into small pieces, the arrangement employed for depositing such pieces into the butter chips, and the ejectors for the filled chips.
Figures 9, 11:
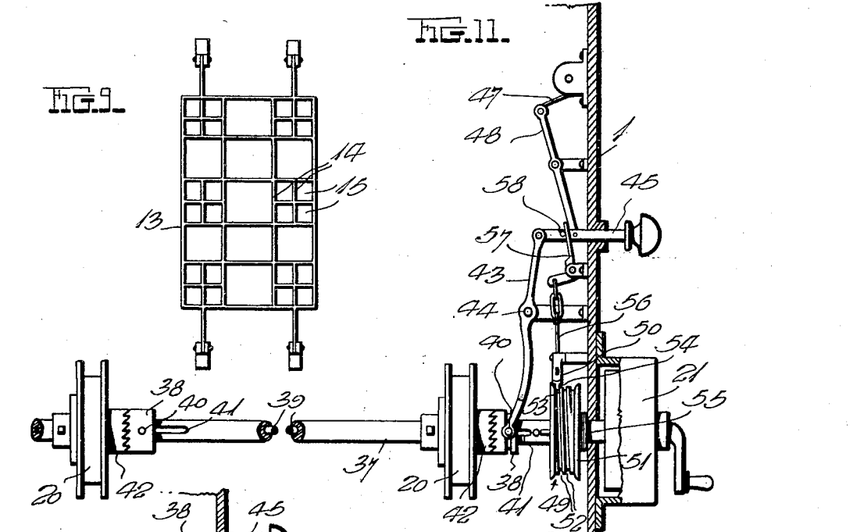
Fig. 9 is a plan view of one of the frames which retain the pieces of butter prior to depositing thereof in the chips.
Figs. 11 and 12 illustrate the same mechanism shown in Fig. 10 but disclose different positions of parts to be hereinafter described.

The front of the casing 1 is provided with suitable doors 4, and horizontal tracks 5 extend rearwardly from the vertical edges of these doors to support groups of vertical butter receptacles 6, each of such groups being carried by a suitable frame 7 which is by preference provided with shoes 8 slidable on the tracks 5. Handles 9 may be provided for the frames 7 and when the doors 4 are open, the frames and receptacles may be withdrawn for cleaning and refilling. In the open lower ends of the butter receptacles 6 are blades 10 which are adapted to cut the blocks of butter 11 into small pieces for reception in butter chips 12. Below the blades 10, one or more open frames 13, as seen most clearly in Figs. 2, 8 and 9, are located, said frame or frames having crossed vertical webs 14 below the blades 10 and forming spaces 15 adapted to receive the butter projected from the receptacles 6, such projected butter being severed from the butter within the receptacles, by a wire 16 or other suitable knife which is operable across the top of the frame or frames 13.

The knife 16 is preferably mounted on the upper ends of arms 17 rising from a bar 18 which is slidable beneath the frame or frames 13. Suitable straps 19 are attached to the ends of the knife 16 or to the bar 18 and are secured to drums 20 which are turned by a spring motor 21, through the instrumentality of parts yet to be described, whereby the straps are wound on said drums to pull the knife 16 forwardly between the receptacles 6 and the frame or frames 13, thus severing the projected butter from that contained in said receptacles. When the action of the spring motor 21 is relieved, a strap 22 and a spring wound drum 23 serve to return the parts 16, 17, 18, 19 and 20 to their initial positions. The drum 23 may be mounted in any preferred manner, but is shown secured on an arched bar 24 which passes transversely between the two sets of butter receptacles 6.

Figure 3:
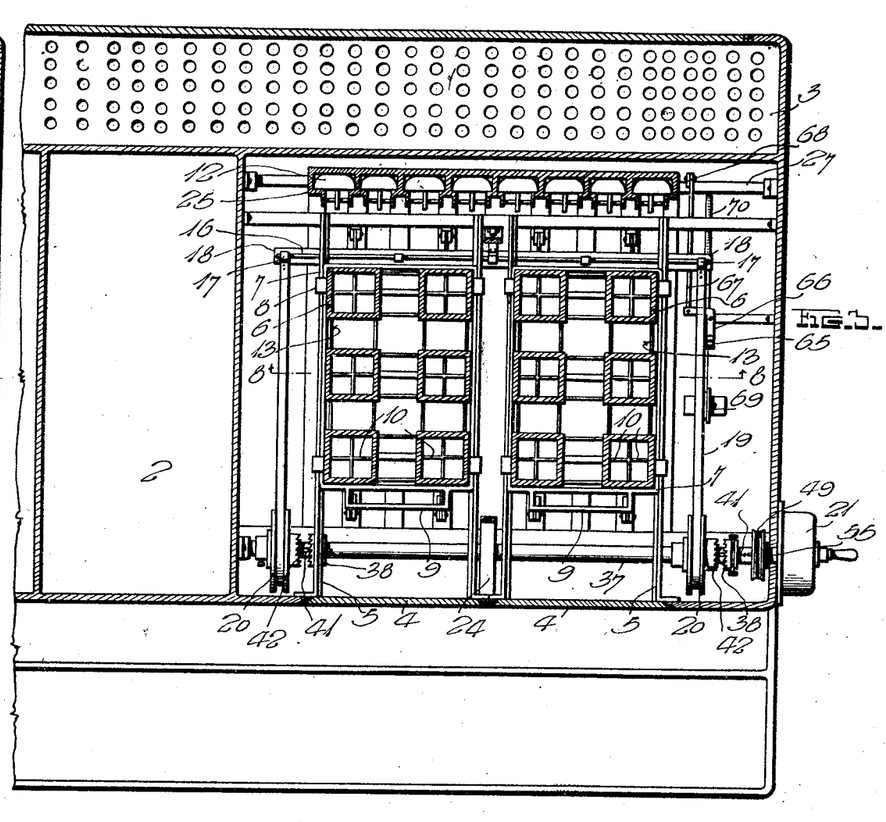
Fig. 3 is a horizontal section on the plane of line 3—3 of Fig. 1.
Figure 4:
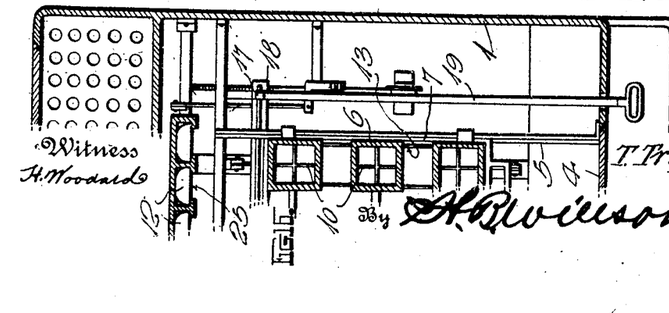
Fig. 4 is a vertical transverse section on the plane indicated by line 4—4 of Fig. 1.
Figures 4, 17:
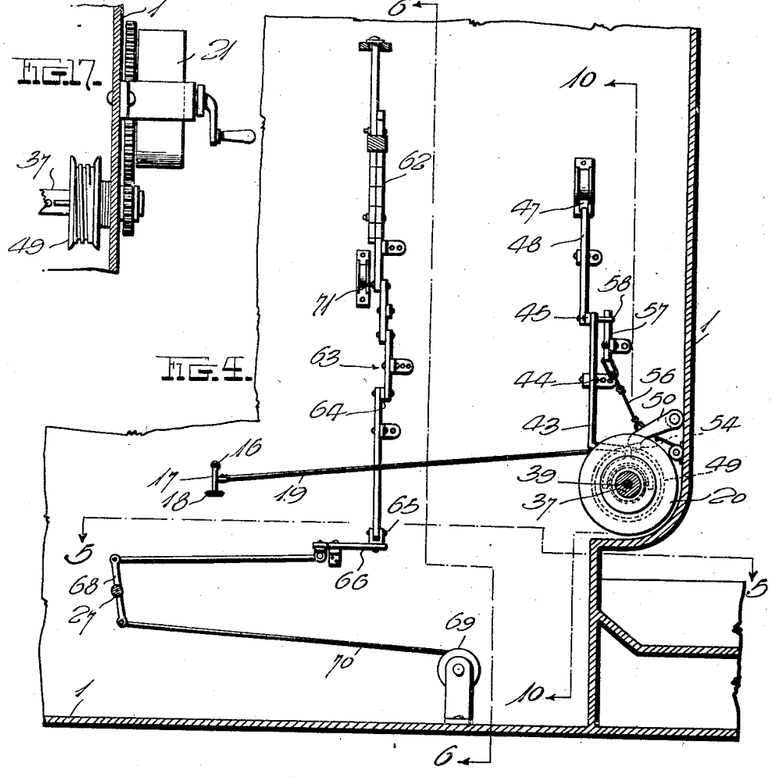
Fig. 17 is a detail view showing the manner of using multiplying gear between the spring motor 21 and the shaft 37.
Figure 5:
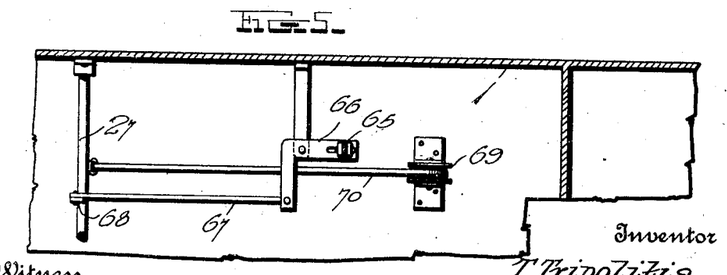
Fig. 5 is a detail horizontal section as indicated by line 5—5 of Fig. 4.

A plurality of chutes 25 are provided for the butter chips 12, the lower ends of said chutes turning forwardly under the receptacles 6, whereby to properly position the chips to receive butter from the frames 13, and in order to guide the pieces of butter into said chips, suitable deflectors 26 are employed. Only a predetermined number of chips are positioned beneath the receptacles 6 at one time and the remainder of said chips are held in the vertical portions of the chutes 25 by an appropriate check which is shown as consisting of a rock shaft 27 having projecting fingers 28 extending into the chutes as seen most clearly in Figs. 2 and 3. When the fingers 28 stand as seen in Fig. 2, they support the chips against sliding beneath the receptacle 6, but when turned to the dotted line position of this figure, the chips are allowed to descend, and their movement is preferably checked by rubber rollers or the like 29, so that danger of breakage is minimized.

Figures 14, 15:
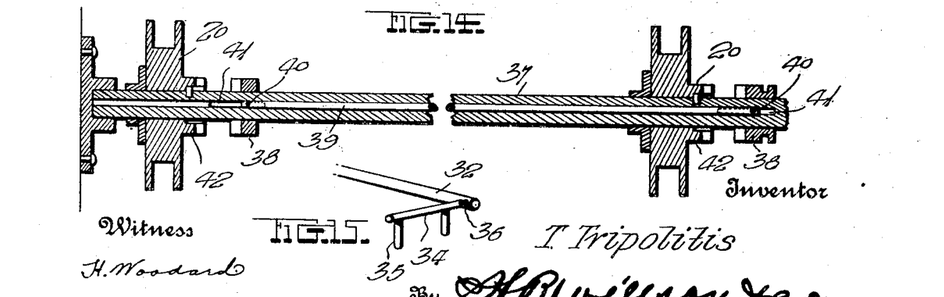
Fig. 14 is a longitudinal section through the operating shaft of the butter cutting knife and the parts mounted thereon.
Fig. 15 is a perspective view of one of the ejectors for the butter chips.

After filling of a number of the chips, they may be withdrawn through suitable doors 30 onto a tray or the like 31, by means of sliding ejecting rods 32 which are suitably mounted in tubes or the like 33, the rear ends of said rods having laterally extending rotatable arms 34 provided with depending fingers 35. The arms 34 are mounted for rotation in order that the fingers 35 may swing forwardly to allow passage of the chips 12 thereunder, but appropriate stops 36 are employed to prevent rearward swinging of the fingers beyond vertical positions as seen in Figs. 2 and 15. By this arrangement, a forward pull on any of the rods 32 will eject any required number of filled butter chips.

The drums 20 are shown mounted rotatably upon a tubular shaft 37 positioned in the front portion of the casing 1, and the spring motor 21 is connected with said shaft for rotating the same when required. Sliding clutch members 38 are mounted on the shaft 37 for rotation bodily therewith and these members may well be tied together by a rod 39 in said shaft. Transverse pins 40 passing through slots 41 in shaft 37 are by preference used for connecting the clutch members 38 to rod 39. For shifting the clutch members 38 into operative engagement with the corresponding clutch members 42 of the drums 20, I employ appropriate means which preferably consists of a vertical lever 43 fulcrumed between its ends at 44 and connected at its upper end with an operating rod 45 which slides through one end of the casing 1. After operation, the parts 45, 43 and 38 are returned to their normal positions by a spring wound strap 47 and a lever 48, the latter being connected to the rod 45, these several details being illustrated most fully in Figs. 10 to 12.

To normally hold the shaft 37 against rotation under the action of the spring motor 21, I mount a stop wheel 49 on said shaft and provide a pivoted dog 50 coacting with said wheel. The wheel 49 is provided with side flanges 51 and with a helical groove 52 between them, one end 53 of said groove forming a stop normally abutting the nose 54 of the dog 50, whereby to hold shaft 37 against turning. When the dog is released from the stop 53 however, the motor 21 comes into play to drive the shaft 37 and the drums 20 which are then connected therewith by means of the sliding clutches 38. The wheel 49 is slidably keyed upon shaft 37 and an appropriate spring 55 is provided for shifting said wheel a short distance along said shaft, the moment the dog 50 is released. Thus, when the dog is again allowed to move downwardly into engagement with the periphery of wheel 49, its nose 54 will travel in the end of groove 52 remote from the stop 43. By the time the wheel has rotated sufficiently to wind the bands 19 on the drums 20 and shift the knife 16 to the limit of its forward movement, however, the nose 54 has again reached the stop 53 with the result that the shaft 37 is brought to a standstill. The clutches 38 are now released and the spring wound strap 22 returns the knife 16 and connected parts to normal position.

For lifting the dog 50 out of engagement with stop 53, I preferably connect said dog by suitable linkage 56 with a bell crank 57 and position one arm of said bell crank in the outward path of a pin or the like 58 carried by the rod 45. During the movement of this rod to actuate lever 53 and throw the clutches 35 in, the pin 58 does not strike the bell crank 57. However, a further outward pull of rod 45, which pull is permitted by the resiliency of lever 43, causes the pin in question to strike the bell crank 57, thus raising the dog 50 and releasing the wheel 49. Once the device starts operating, the rod 45 is released and the dog 50 may thus descend into the groove 52. The frictional engagement however of the members 38 and 42 is of greater strength than the spring connected to the strap 47, with the result that said clutches will remain interengaged until the shaft 37 is brought to a sudden standstill by the stop 53 striking the nose 54. When this takes place, the frictional contact existing between the clutches is momentarily released and the parts 47, 48, 45 and 43 come into play for shifting the clutches 38 to disengaged position, whereupon the knife 16 is returned to normal position by the spring wound strap 22.

Figures 10, 12, 13:
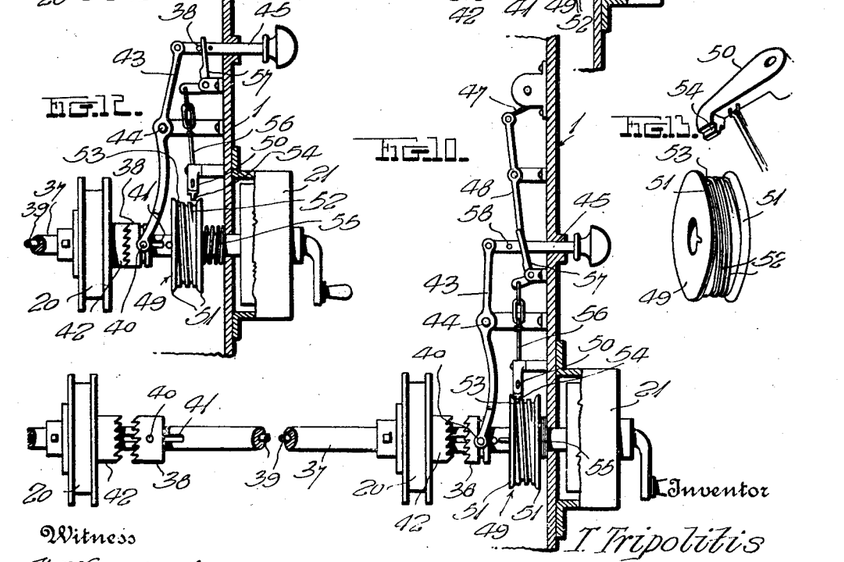
Fig. 10 is a sectional view approximately on the planes of line 10—10 of Fig. 4, showing the operating and control means of the butter cutting knife in its normal positions.
Fig. 13 is a perspective view of the stop wheel and dog for the spring motor used in operating the butter cutting knife.

Fig. 10 shows the normal position of the parts just described, with the dog 50 in locking engagement with the wheel 49 and with the clutches 38 thrown out; Fig. 11 illustrates the rod 45 pulled outwardly to move the clutches 38 to operative position and to dispose the pin 58 against bell crank 57; and Fig. 12 illustrates the relation of parts when rod 45 is pulled farther outward. In this last named figure, bell crank 57 has operated to release dog 50, and spring 55 has shifted the stop wheel 49 along the shaft 37 so that when the dog is released, it will enter the end of the groove 52 remote from the stop 53.

Figure 1:
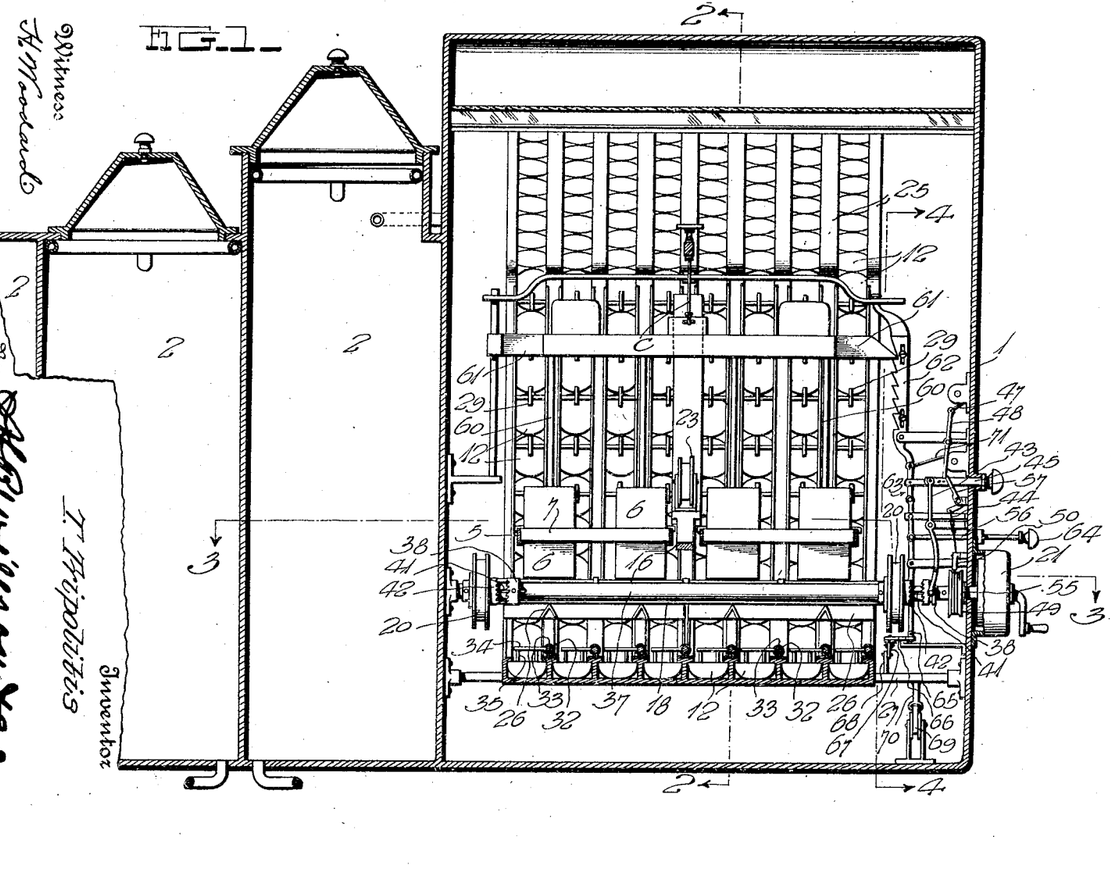
Figure 1 is a general view cut longitudinally through the front portion of the casing and illustrating most of the interior parts in elevation.
Figure 6:
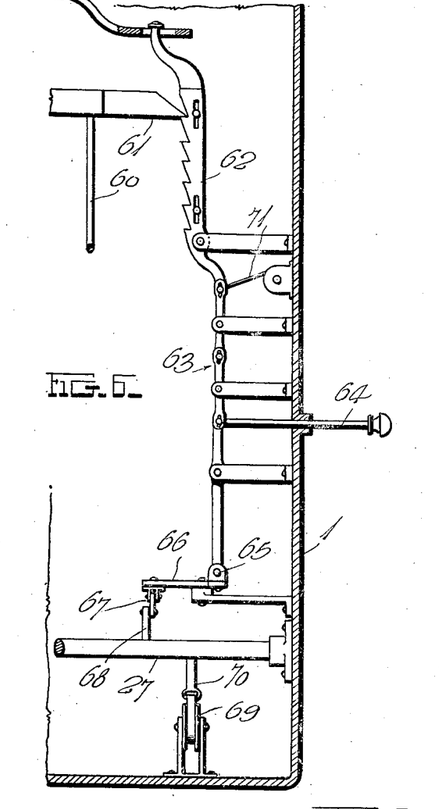
Fig. 6 is an enlarged detail longitudinal section showing the control means for the butter ejecting plungers and the check by means of which the butter chips are released for positioning beneath the butter cutting means.

For projecting the blocks of butter 11 from the receptacles 6, plungers 60 are shown depending from a weighted frame 61 suitably guided and controlled in its downward movement by a toothed rack bar 62 which may be adjustable in the same manner described in the patent above referred to. By means of suitable connections 63 such as a plurality of levers, and an operating rod 64 passing through one end of the casing 1, the rack bar 62 may be moved from the operative position shown in Figs. 1 and 6, to the released position depicted in Fig. 7 and thus the weighted frame 61 comes immediately into play to depress the blocks of butter 11 sufficiently to project a predetermined quantity thereof from the lower ends of the receptacles 6, the butter being cut into small pieces by the blades 10, during its projection. The lowermost of the levers 63 is shown suitably connected at 65 to a horizontal bell crank 66 suitably mounted in the casing 1, said bell crank being connected by a link or the like 67 with a crank arm 68 on the shaft 27. By this arrangement, when the operating rod 64 is pulled outwardly to release the plungers 60, the connections 66, 67, and 68 are operated to turn the shaft 27 in such manner as to move its fingers 28 to inoperative position, thus allowing a number of the butter chips to slide downwardly beneath the receptacles 6.

Figure 7:
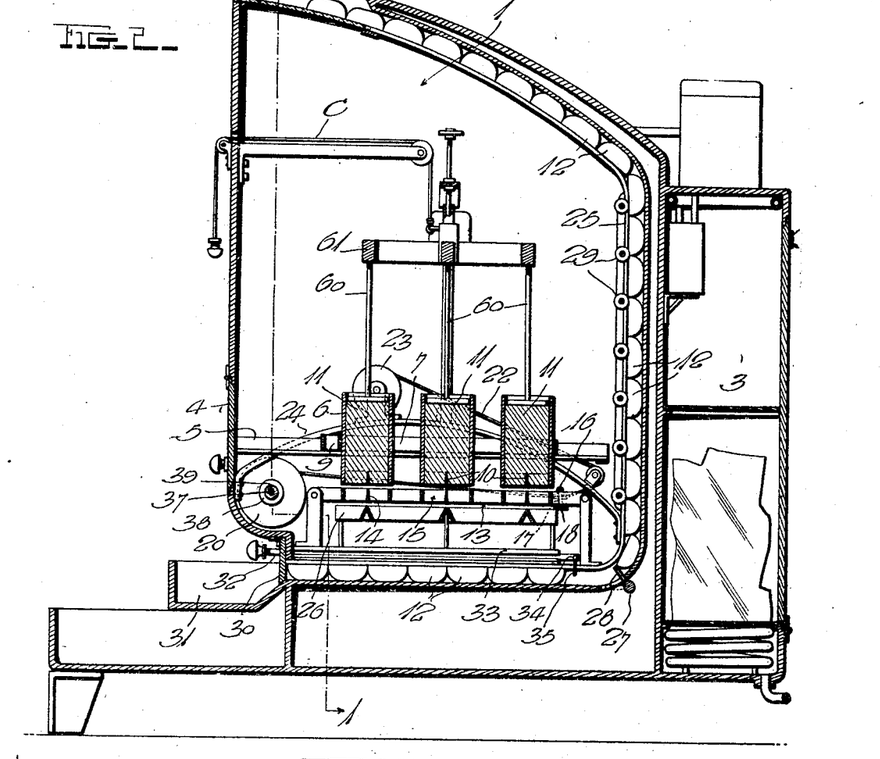
Fig. 7 is a view similar to Fig. 6 but showing a different position of parts.

A spring wound strap 69 may connect with a crank arm 70 on the shaft 27 for restoring the latter to normal position after each operation thereof, and a similar strap 21 may be connected with the rack bar 62 for the same purpose. When filling the receptacle 6 with butter, the plungers 60 and associated parts are raised by means of a cord or the like C and the receptacles in question may then be removed, together with their carrying frames 7. After filling, the frames and receptacles are again inserted and the plungers 60 are lowered onto the butter as seen in Fig. 2. The temperature within the casing is sufficiently low to chill and harden the butter so that its own weight does not act to lower it in the receptacles 6, this being done however whenever required by means of the weighted frame 61, when the rack bar 62 is released as shown in Fig. 7. This releasing is accomplished by forcing the rod 64 inwardly and at the same time the connections between said rod and the shaft 27, turn the latter to release a number of butter chips 12, thus allowing them to move downwardly beneath the guides 26. The rod 64 is forced inwardly and immediately released, with the result that rack bar 62 swings outwardly sufficiently to permit descent of the frame 61, but is again moved inwardly to arrest the movement of said frame when it has descended a distance equal to the length of one tooth of said rack bar. This descent of frame 61 and its plungers 60, projects a predetermined quantity of butter from the receptacles 6 and the blades 10 cut such butter into small pieces, which pieces are received in the openings 15. The rod 45 is now pulled outwardly to bring the spring motor 21 into play for winding the straps 19 on the drums 20, thus operating the knife 16 to sever the projected butter from that contained within the receptacles 6, leaving the disconnected pieces contained within the openings 15 of the frame 13. When the rod 45 is released, the spring wound strap 22 comes into play to return the knife and associated parts to normal position. When more butter is now projected from the receptacles 6, the severed pieces within the openings 15 are forced from said openings and are directed into the chips 12 by the guides 26.

By providing the frame 13 and retaining the severed pieces of butter in the openings 15, prior to depositing thereof into the butter chips, there is no tendency for these pieces to again join each other and interfere with proper working of the machine, as was the case in the patent above referred to. This constitutes one feature of improvement, while the others reside in the check 27 and its association with the parts which control the descent of the butter projecting means, in the novel ejectors for the filled butter chips, in the arrangement employed for permitting the drums 20 to rotate sufficiently to project the knife 16 to the required extent, in the manner of mounting the receptacles 6, and in the checking rollers 29 for the butter chips. These features are preferably embodied in the forms shown, but may vary as occasion may dictate.

I claim:

1. In a butter dispensing machine, a casing containing a butter receptacle, means for projecting the butter from the lower end of said receptacle, means for cutting the butter into small pieces as it is projected from said receptacle, a frame spaced below said receptacle and having openings to receive the pieces of butter, a knife operating between said frame and said receptacle, and a butter chip support below said frame.

2. In a butter dispensing device, a casing containing a butter receptacle open at its lower end, means for projecting the butter from said lower end of the receptacle, a frame spaced below said receptacle and having an opening to snugly receive the projected butter, a knife operating between said receptacle and frame, and a butter chip support below said frame.

3. In a butter dispensing device, a casing, a plurality of butter receptacles in said casing having open lower ends, means for projecting the butter from said lower ends of the receptacles, a fixed horizontal frame in said casing spaced slightly below said receptacles and having openings to receive the projected butter, a knife operable between said frame and said receptacles, a butter chip support below said frame, an additional frame upon which said receptacles are mounted, horizontal tracks in said casing upon which said additional frame is slidably mounted, and a door in said casing through which said additional frame and said receptacles are removable.

4. In a butter dispensing device, a casing having a door, horizontal tracks extending inwardly from said door, a frame slidable on said tracks, butter receptacles mounted on said frame, said receptacles and frame being removable through said door, means in said casing for projecting the butter from the lower ends of said receptacles, and means for severing the projected butter from that contained in said receptacles.

5. In a butter dispensing device, a casing, a butter receptacle in said casing, self-lowering means for projecting the butter from the lower end of said receptacle, and means for severing the projected butter from that contained in said receptacle; together with a chute adapted to contain butter chips, said chute having a vertical portion and a horizontal portion, the latter extending beneath said receptacle, releasable means for checking the descent of butter chips in said vertical portion of the chute, means for preventing descent of said butter projecting means, and common operating means for said chip checking means and said descent preventing means.

6. In a butter dispensing device, a casing, a butter receptacle in said casing, self-lowering means for projecting the butter from the lower end of said receptacle, and means for severing the projected butter from that contained in said receptacle; together with a chute adapted to contain butter chips, said chute having a vertical portion and a horizontal portion, the latter extending beneath said receptacle, releasable means for checking the descent of butter chips in said vertical portion of the chute, means for preventing descent of said butter projecting means, and means operable from a single control for simultaneously releasing said chip checking means and said descent preventing means.

7. In a butter dispensing device, a casing having a butter receptacle, self-lowering means for projecting the butter from said receptacle, and means for severing the projected butter from that contained in said receptacle; together with a butter chip chute having a vertical portion and a horizontal portion, the latter extending beneath said receptacle, a rock shaft having projecting means extending into said chute for checking the descent of the butter chips therein, means to normally prevent descent of said butter projecting means, operating connections tying said descent preventing means and said rock shaft together for operation in unison, and a handle for said connections.

8. The combination with a butter dispensing device including a vertical chute for butter chips, of a plurality of rollers spaced along said chute and formed of yielding material, said rollers being disposed for contact with the butter chips to prevent rapid descent thereof.

9. The combination with a butter dispensing device including a chute having a horizontal portion to contain butter chips, and means for filling said chips; of a guide adjacent said horizontal portion of said chute, a rod slidable in said guide, an arm projecting from the inner end of said rod and rotatable in one direction only, and a finger extending from said arm for contact with the butter chips, substantially as and for the purpose set forth.

10. In a butter dispensing device, a casing having a butter receptacle and means for projecting butter from its lower end, a knife movable across the lower end of the receptacle for cutting the butter, a strap connected with said knife at one end, a drum to which the other end of said strap is secured, a shaft for driving said drum, a spring motor for rotating said shaft, a clutch for connecting said drum to said shaft, means including an operating handle for moving said clutch to operative position, a stop wheel on said shaft having a helical groove in its periphery, a dog having a nose positioned in said groove and abutting one end of the latter to normally hold said stop wheel and shaft against rotation, means operated by the aforesaid handle for releasing said dog from said groove, and means for then shifting said dog and stop wheel relatively, whereby said dog may be received in another portion of said groove, substantially as and for the purpose set forth.

11. A structure as specified in claim 10, said stop wheel being shiftable axially on said shaft; said means for relatively shifting said dog and stop wheel consisting of a spring for shifting said wheel when said dog is released.

In testimony whereof I have hereunto set my hand.

THEMIOS TRIPOLITIS.